United States Patent [19]

Tanaka et al.

[11] Patent Number: 4,685,341

[45] Date of Patent: Aug. 11, 1987

[54] POWER TRANSMITTING APPARATUS FOR TRACTOR

[75] Inventors: Tomiho Tanaka, Matsubara; Takashi Suzuki; Mitsuo Watashi, both of Sakai, all of Japan

[73] Assignee: Kubota, Ltd., Osaka, Japan

[21] Appl. No.: 850,326

[22] Filed: Apr. 11, 1986

[30] Foreign Application Priority Data

Aug. 2, 1985 [JP] Japan .......................... 60-119467[U]
Aug. 2, 1985 [JP] Japan ................................ 60-171592

[51] Int. Cl.⁴ ............................................ F16H 37/00
[52] U.S. Cl. ................................ 74/15.82; 74/665 G
[58] Field of Search ................ 74/15.82, 15.88, 15.84, 74/665 F, 665 G, 665 GA, 745, 15.2, 15.4

[56] References Cited

U.S. PATENT DOCUMENTS

| | | | |
|---|---|---|---|
| 2,914,966 | 12/1959 | Arnold | 74/15.84 |
| 3,985,044 | 10/1976 | Stockton | 74/15.88 |
| 4,208,923 | 6/1980 | Ikegami | 74/665 G |
| 4,245,514 | 1/1981 | Miyahara et al. | 74/15.84 |
| 4,275,608 | 6/1981 | Brancolini | 74/665 GA |
| 4,294,131 | 10/1981 | Murayama | 74/15.4 |
| 4,498,349 | 2/1985 | Nishihara | 74/15.82 |
| 4,565,102 | 1/1986 | Miyahara et al. | 74/15.84 |

FOREIGN PATENT DOCUMENTS 0090455 6/1982 Japan .................................. 74/15.4

Primary Examiner—Cornelius J. Husar
Assistant Examiner—Peter M. Cuomo
Attorney, Agent, or Firm—Edwin E. Greigg

[57] ABSTRACT

A power transmitting apparatus for a tractor is provided, which includes a travel drive line and a PTO drive line. The travel drive line is operatively connected to an engine through a running-travel clutch whereas the PTO drive line is directly connected to the engine and includes thereon a PTO clutch. Thus the two drive lines are independent of each other in respect of power transmission and clutching operation.

4 Claims, 13 Drawing Figures

Fig. 5
Fig. 6
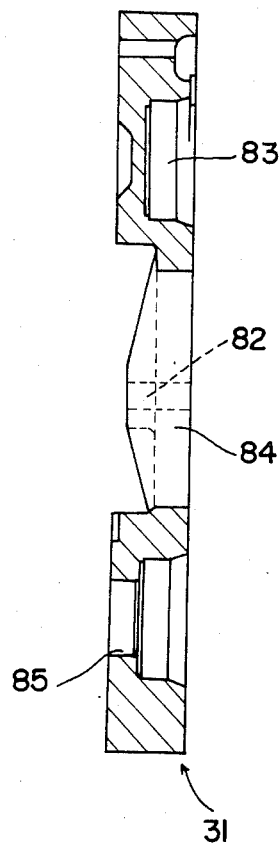
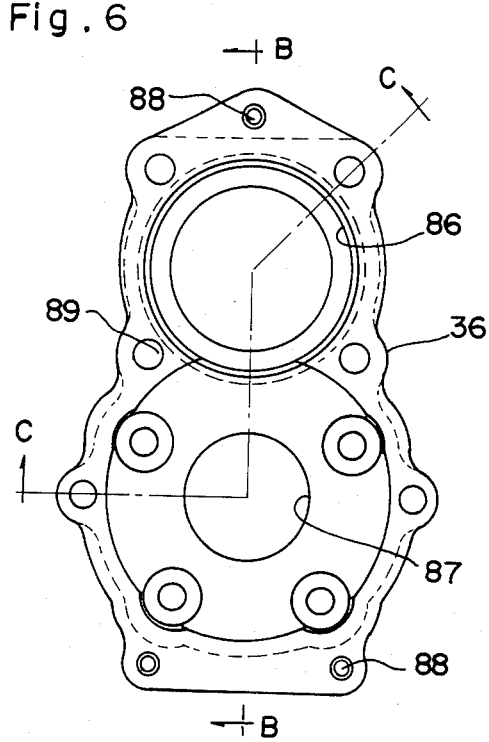
Fig. 8
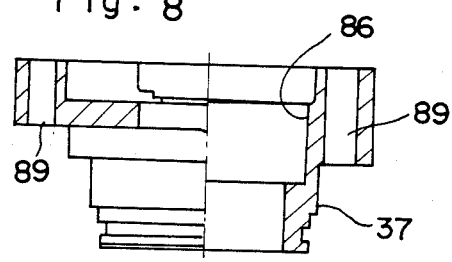
Fig. 12
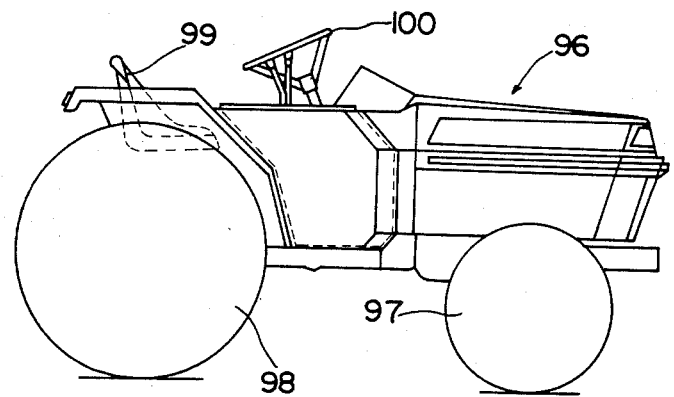

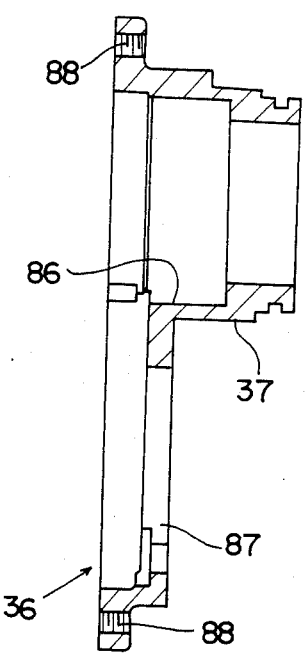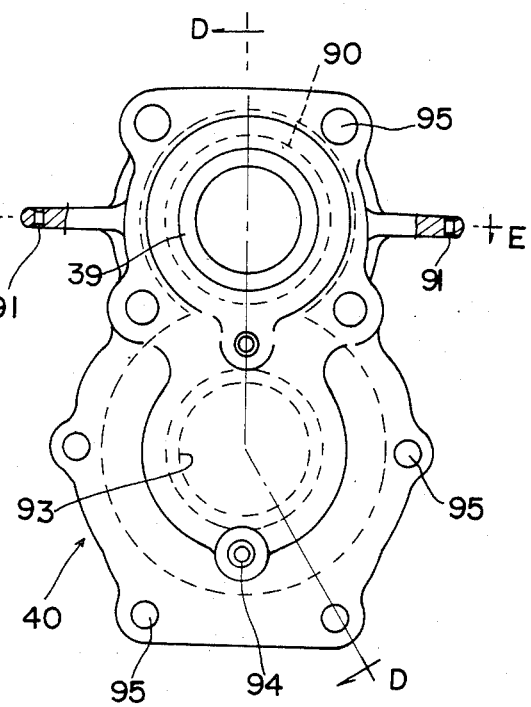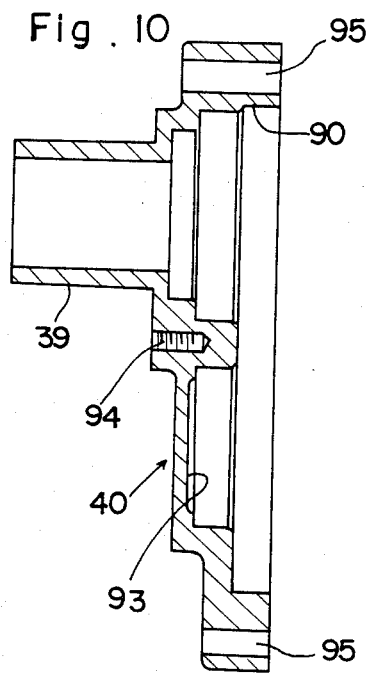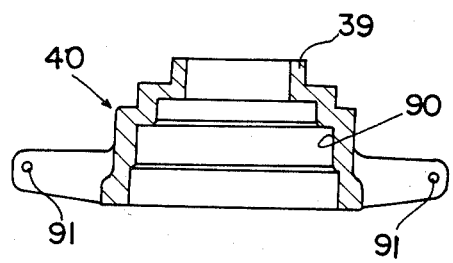

POWER TRANSMITTING APPARATUS FOR TRACTOR

BACKGROUND OF THE INVENTION

The present invention relates to a power transmitting apparatus for a tractor, and more particularly to a power transmitting apparatus for a tractor including two drive lines, i.e. a travel drive line and a PTO or power takeoff drive line.

In an existing power transmitting apparatus of this type the travel drive line and PTO drive line receive power from a single shaft and therefore the two drive lines cannot be independent of each other. Such a construction is inconvenient for a grass handling or grass cutting operation for example.

SUMMARY OF THE INVENTION

An object of this invention is to provide a power transmitting apparatus for a tractor adapted to drive the travel drive line and PTO drive line independently.

According to one aspect of this invention, a power transmitting apparatus for a tractor comprises a travel drive line provided between a running-travel main shaft and differential means, the running-travel main shaft being operatively connected to an engine through a running-travel clutch, and PTO drive line provided between a PTO main shaft and a PTO output shaft and including a PTO clutch, wherein the PTO main shaft is relatively rotatably fitted on the running-travel main shaft and directly connected to the engine, and the PTO clutch is disposed on the PTO drive line downstream of the PTO main shaft.

With the above construction, the running-travel main shaft receives torque output of the engine through the running-travel clutch whereas the PTO output shaft is driven independently of the travel drive line since the PTO main shaft is directly connected to the engine. The power transmission to the PTO output shaft is established and broken by operating the PTO clutch disposed on the PTO drive line downstream of the PTO main shaft.

BRIEF DESCRIPTION OF THE DRAWINGS

The above and other objects and features of the present invention will become apparent from the following description taken in conjunction with the preferred embodiment thereof with reference to the accompanying drawings, in which:

FIG. 5 is a sectional view taken on line A—A of FIG. 4, FIG. 6 is a front view of a gear case, FIG. 7 is a sectional view taken on line B—B of FIG. 6, FIG. 8 is a sectional view taken on line C—C of FIG. 6, FIG. 9 is a front view of a gear case cover, FIG. 10 is a sectional view taken on line D—D of FIG. 9, FIG. 11 is a sectional view taken on line E—E of FIG. 9, and FIG. 12 is a schematic side elevation of a tractor.

DESCRIPTION OF THE PREFERRED EMBODIMENT

Figure 1A:
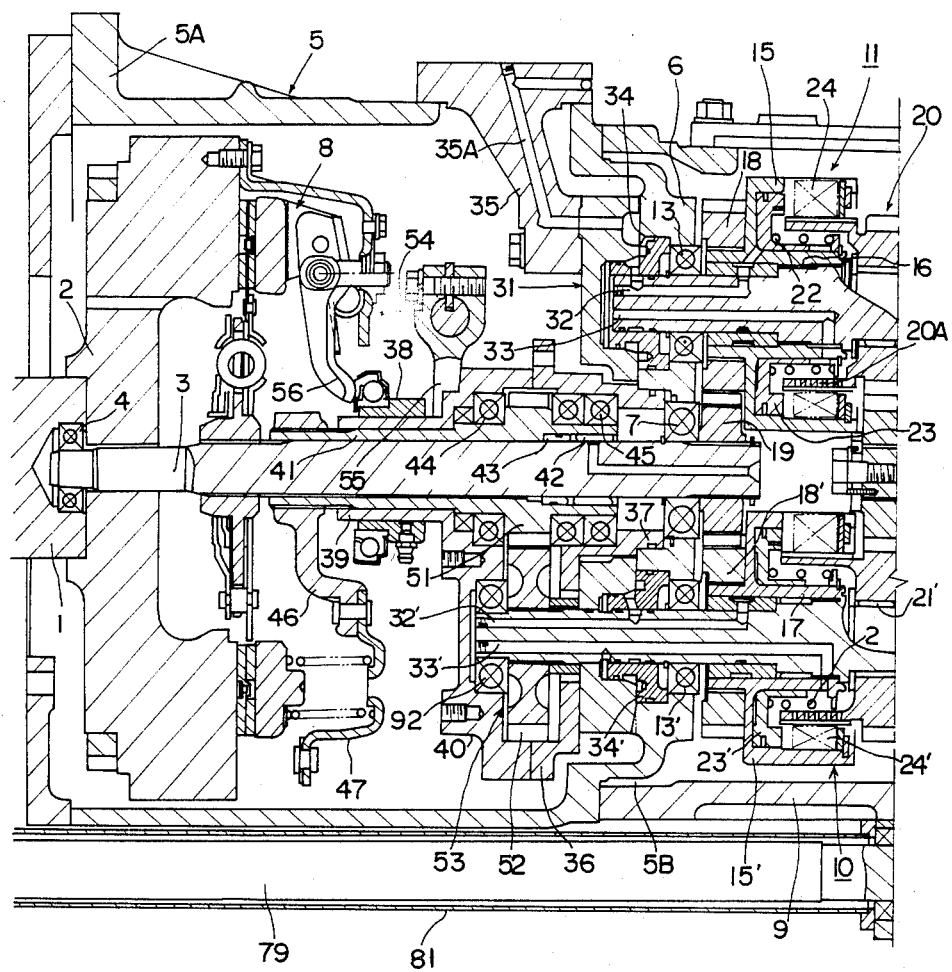
FIGS. 1a and 1b are side views in vertical section of a principal transmitting portion embodying the present invention.
Figure 1B:
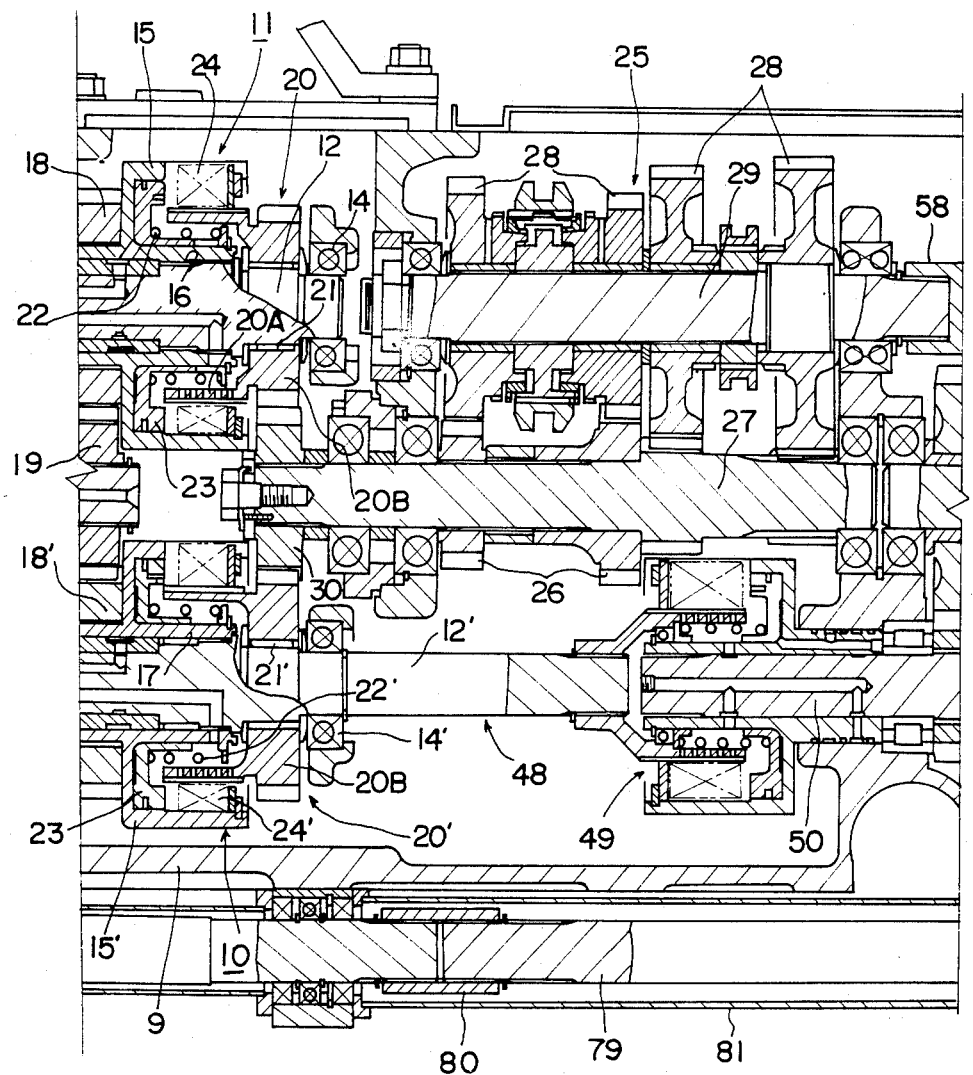

In FIGS. 1a and 1b, number 1 denotes a crankshaft of an engine carrying a flywheel 2.

Number 3 denotes a running-travel main shaft supported at a forward end thereof by the crankshaft 1 through bearings 4 and at a rear end thereof by a rear wall 6 of a flywheel housing 5 through bearings 7. The running-travel main shaft 3 is operatively connected to the engine through a running-travel clutch 8.

The flywheel housing 5 is open at a forward end thereof and defines a front flange 5A attached to a crankcase of the engine by means of bolts not shown. The flywheel housing 5 encloses the flywheel and the clutch 8. Its rear wall 6 converges through a stepped portion 5B and extends rearwardly into a front opening of a first transmission case 9 to be secured thereto by means of bolts not shown.

Number 10 denotes a forward rotation hydraulic clutch, and number 11 denotes a backward rotation hydraulic clutch, the two clutches having the same construction.

Number 12 denotes a running-travel clutch shaft supported by front and rear bearings 13 and 14. A clutch body 15 is fitted on the running-travel clutch shaft 12.

In this example, while the clutch body 15 which is for backward rotation is rotatable in unison with the running-travel clutch shaft 12 through splines 16 or the like, a clutch body 15' for forward rotation is relatively rotatably fitted on the first PTO transmission shaft 12' through needle bearings 17.

The clutch body 15 includes an input gear 18 in mesh with a drive gear 19 mounted at a rear end of the running-travel main shaft 3. Its forward rotation and backward rotation have the same gear ratio.

Number 20 denotes an output member fitted on the running-travel clutch shaft 12 through needle bearings 21. The output member 20 includes a clutch plate support portion 20A and a gear portion 20B. The clutch plate support portion 20A is movable in the clutch body 15 to actuate a piston 23 against a return spring 22 to cause engagement and disengagement of a clutch element 24.

Thus, it will be clear that the forward rotation hydraulic clutch 10 and backward rotation hydraulic clutch 11 are mounted in a front half of the first transmission case 9 and opposed, vertically opposed in this example, to each other across the running-travel main shaft 3.

Number 25 denotes a main change speed mechanism comprising, in this example, a constant mesh type four-step change speed gearing. The main change speed mechanism 25 includes a running-travel transmission shaft 27 having a group of varied diameter gears 26 and an auxiliary change speed shaft 29 having change speed gears 28. The running-travel transmission shaft 27 is supported to be substantially coaxial with the running-travel main shaft 3 and carries an interlocking gear 30 fixed to a forward end thereof. This gear 30 is in direct mesh with the gear portion 20B of the forward rotation hydraulic clutch 10 and is operatively connected to the gear portion 20B of the backward rotation hydraulic clutch 11 through an intermediate gear not shown.

Number 31 denotes an oil distributing manifold for distributing oil through sealing rings 34 to first oil passages 32, 32' and second oil passages 33, 33' defined axially in the running-travel clutch shaft 12 and the first PTO transmission shaft 12'. The mainfold 31 is bolted to a front face of the rear wall 6 of the flywheel housing 5.

This oil distributing manifold 31 is in communication with a connecting member 35 having an oil passage 35A extending through an upper wall of the flywheel housing 5.

Number 36 denotes a gear case including an upper tubular portion 37 extending rearwardly through the manifold 31. This gear case 36 is covered by a case cover 40 having a tubular support portion 39 for supporting a clutch release hub 38. The gear case 36 and case cover 40 are combined together to define a space therebetween. As described, the rear wall 6 of the housing 5 fits into the transmission case 9, the oil distributing manifold 31 is attached to the rear wall 6, and the gear case 36 penetrates the manifold 31 in the fore and aft direction. This arrangement permits a tractor body to have a significantly reduced fore and aft length.

Number 41 denotes a PTO main shaft having a tubular construction and fitted on the running-travel main shaft 3 through needle bearings 42 and seals 43. The PTO main shaft 41 is supported by the gear case 36 and the case cover 40 through bearings 44 and 45. Further, the PTO main shaft 41 is connected at a forward end thereof to the clutch case 47 through an arm 46, whereby the PTO main shaft 41 is directly connected to the engine.

Number 48 denotes a PTO drive line including the first PTO transmission shaft 12' and a second PTO transmission shaft 50 operatively connected to the first PTO transmission shaft 12 through a hydraulic clutch 49. The first PTO transmission shaft 12' extends through the oil distributing manifold 31 and the gear case 36 to be operatively connected to the PTO main shaft 41 through a reduction gear mechanism 53 comprising a gear 51 mounted on the main shaft 41 and a gear 52 mounted on the first PTO transmission shaft 12'.

Number 54 denotes a clutch mechanism including a release fork 55 and release hub 38. The clutch 8 is disengaged by moving the fork 55 in the clockwise direction in FIG. 1a to force a clutch lever 56 thereagainst.

Figure 2:
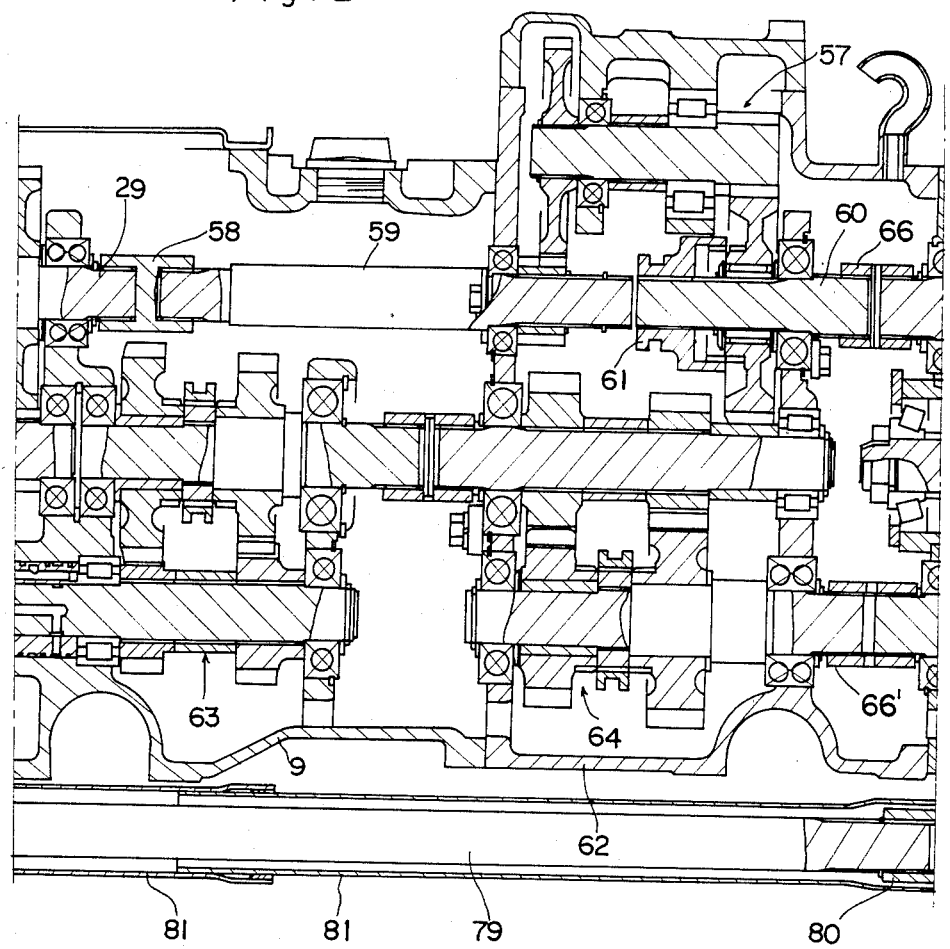
FIG. 2 is a side view in vertical section of an intermediate transmitting portion.

In FIG. 2, number 57 denotes a creep mechanism including a creep input shaft 59 connected to the auxiliary change speed shaft 29 through a coupling 58, and a creep output shaft 60 coaxial with the creep input shaft 59. The two shafts 59 and 60 are connectable to each other by a shifter 61. This creep mechanism 57 is housed in an intermediate case 62.

Number 63 denotes a PTO primary change speed mechanism which, in this example, provides two speeds. Number 64 denotes a PTO secondary change speed mechanism housed in the intermediate case 62 and adapted, in this example, to provide two speeds.

Figure 3:
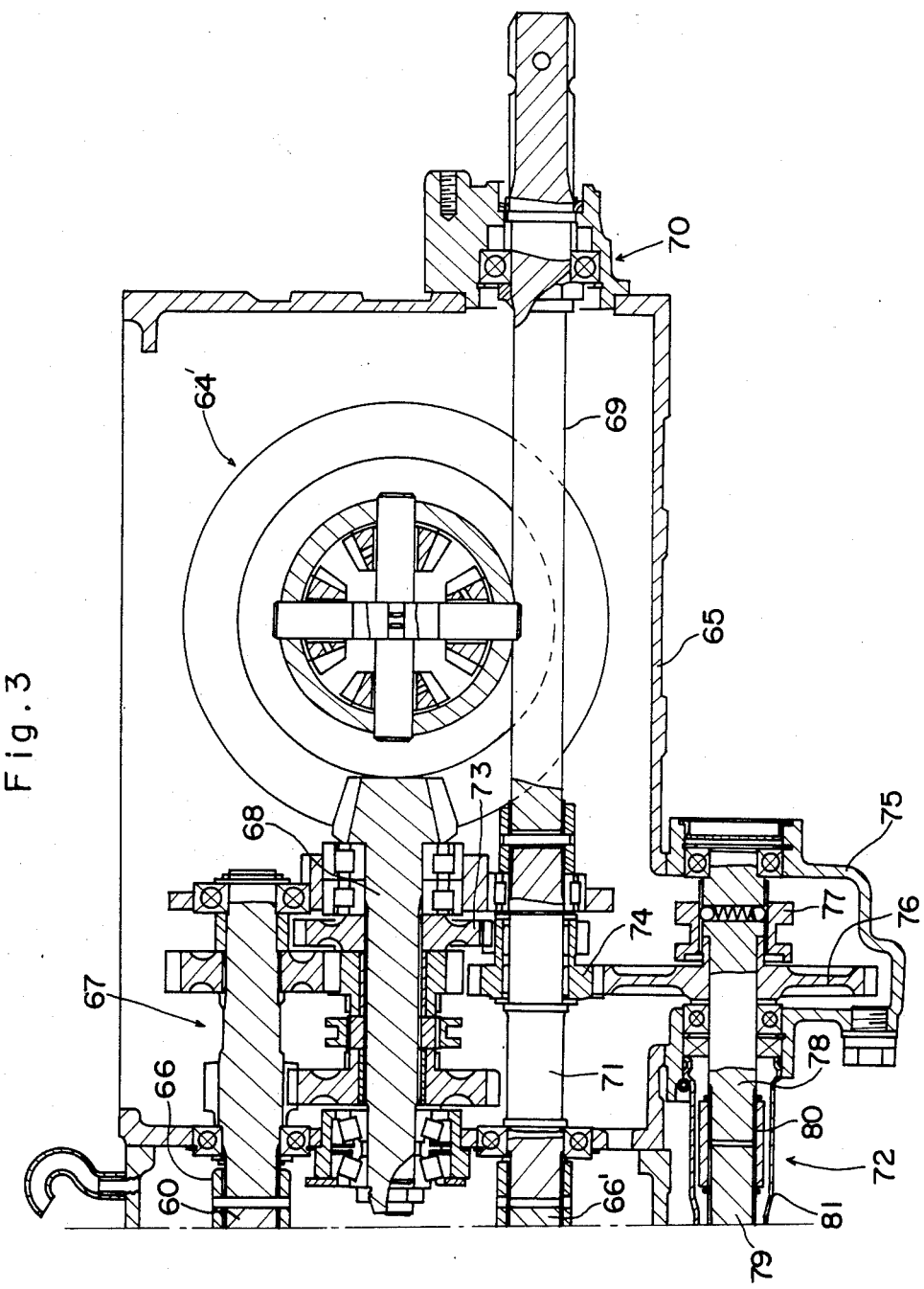
FIG. 3 is a side view in vertical section of a rear transmitting portion.

In FIG. 3, number 64' denotes a differential housed in a second transmission case 65. The differential 64' is operatively connected to a drive shaft 68 of an auxiliary change speed mechanism 67 which is operatively connected to the output shaft 60 of the creep mechanism 57 through a coupling 66.

Number 69 denotes a PTO output shaft supported at an end of the second transmission case 65 through a bearing device 70 and operatively connected to the PTO secondary change speed mechanism 64 through an intermediate shaft 71 and a coupler 66'.

Number 72 denotes a front wheel drive propeller shaft assembly including a gear 76 in a power takeof case 75 operatively connected to the drive shaft 68 through a gear 73 on the drive shaft 68 and a gear 74 on the intermediate shaft 71. The gear 76 is connectable by means of a shifter 77 to a power takeoff shaft 78 connected to a propeller shaft 79 through a coupling 80. Thus the assembly 72 is operatively connected to a front wheel differential.

Number 81 denotes a propeller shaft cover which is flexible in a telescopic manner.

Although in FIG. 1 the forward rotation hydraulic clutch 10 is shown to be rotatable relative to the first PTO transmission shaft 12', the positional arrangement of the clutches 10 and 11 may be vertically reversed from the illustrated arrangement.

FIGS. 4 through 12 show the oil distributing manifold, the gear case, the gear case cover and the outward appearance of a tractor.

Figure 4:
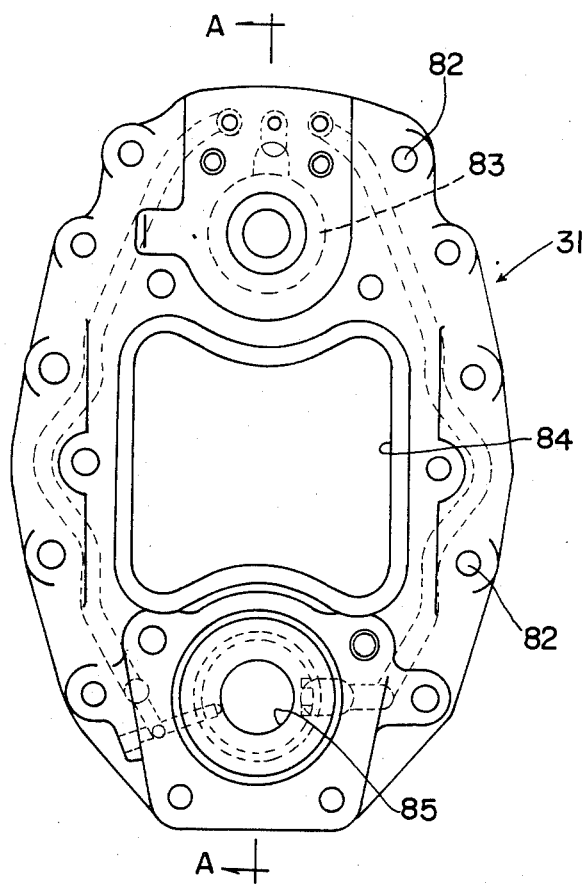
FIG. 4 is a front view of an oil distributing manifold.

Referring to FIGS. 4 and 5, the oil distributing manifold 31 defines attaching bores 82 along an outer periphery thereof, a recess 83 at an upper portion thereof for engaging the seal ring 34, an opening 84 in a vertically intermediate position thereof for receiving the tubular portion 37 of the gear case, and an opening 85 in a lower portion thereof for receiving the PTO transmission shaft 12'.

Referring to FIGS. 6 through 8 showing the gear case 36, the tubular portion 37 disposed at an upper part of the case 36 to be coaxial with a bore 86 for receiving the bearing 45. The gear case 36 further defines an opening 87 at a lower part thereof for receiving the first PTO transmission shaft 12' and extra threaded bores 88 and attaching bores 89 for use in assembly and disassembly.

FIGS. 9 through 11 show the gear case cover 40 defining at an upper part thereof the release hub supporting tubular portion 39 continuous with a recess 90 for receiving the bearing 44, and spring catches 91 at opposite sides of the upper portion to retain the return spring of the release hub 38. The gear case cover 40 further defines a recess 93 for receiving a forward end of the first PTO transmission shaft 12' through a bearing 92, extra threaded holes 94 in a front face thereof for use in assembly and disassembly, and attaching bores 95 along an outer periphery thereof. The gear case 36 and the gear case cover 40 are combined to define a space therebetween and are detachable from each other in the fore and aft direction.

FIG. 12 shows a tractor 96 incorporating the power transmitting apparatus according to the present invention and having front wheels 97 and rear wheels 98. This tractor is the reverse type having a driver's seat 99 and a steering wheel 100 positionally interchangeable.

What is claimed is:

1. A power transmitting apparatus for a tractor comprising:
   a flywheel driven by a crankshaft of an engine,
   a travel drive line defined between a running-travel main shaft (3) and differential means (64'), said running-travel main shaft being operatively connected to an engine through a running-travel clutch (8) related to said flywheel,
   a PTO drive line defined between a PTO main output shaft (41) and a PTO output shaft (69), said PTO main output shaft being coaxially supported on said running-travel main shaft and connected directly to said flywheel for rotation therewith, oppositely disposed forward and backward rotation switching means disposed on opposite sides of said running-travel main shaft and operatively connected to said running-travel main shaft to rotationally control said travel drive line and said PTO drive line, said PTO drive line includes a PTO transmission shaft operatively connected to said PTO main shaft, said backward and forward rotation switching means having forward rotation clutch means and backward rotation clutch means, one of said clutch means being relatively rotatably fitted on said PTO transmission shaft, a PTO hydraulic clutch disposed on said PTO drive line downstream of said switching means fitted on said PTO transmission shaft, and change speed means downstream of said hydraulic clutch disposed on said PTO drive line, said change speed means being operative to provide a plurality of speeds for said PTO drive output shaft.

2. A power transmitting apparatus as set forth in claim 1 in which said change speed means downstream of said hydraulic clutch includes first and second change speed mechanisms.

3. A power transmitting apparatus as set forth in claim 2 which includes a power take-off means between said PTO drive output shaft and a front wheel drive shaft for driving front wheels of the tractor.

4. A power transmitting apparatus as claimed in claim 1 wherein said travel drive line includes a running-travel transmission shaft coaxial with said running-travel main shaft, and said backward and forward rotation switching means is disposed between and operatively connected to said running-travel main shaft and said running-travel transmission shaft.

* * * * *